(12) United States Patent
Sudbury et al.

(10) Patent No.: US 9,703,988 B1
(45) Date of Patent: Jul. 11, 2017

(54) INTERNET PRIVACY TOOL FOR MITIGATING THIRD PARTY TRANSACTION TRACKING

(71) Applicant: Abine, Inc., Boston, MA (US)

(72) Inventors: Andrew Sudbury, Somerville, MA (US); James Peerless, Boston, MA (US); Robert Shavell, Boston, MA (US)

(73) Assignee: ABINE, INC., Boston, MA (US)

(*) Notice: Subject to any disclaimer, the term of this patent is extended or adjusted under 35 U.S.C. 154(b) by 0 days.

(21) Appl. No.: 14/253,281

(22) Filed: Apr. 15, 2014

Related U.S. Application Data

(60) Provisional application No. 61/952,560, filed on Mar. 13, 2014, provisional application No. 61/845,406, filed on Jul. 12, 2013.

(51) Int. Cl.
*G06F 17/30* (2006.01)
*G06F 21/64* (2013.01)

(52) U.S. Cl.
CPC .................................. *G06F 21/64* (2013.01)

(58) Field of Classification Search
None
See application file for complete search history.

(56) References Cited

U.S. PATENT DOCUMENTS

| | | | |
|---|---|---|---|
| 6,456,984 B1 | 9/2002 | Demoff et al. | |
| 6,839,692 B2 | 1/2005 | Carrott et al. | |
| 7,689,007 B2 | 3/2010 | Bous et al. | |
| 8,261,326 B2 * | 9/2012 | Ben-Natan | 726/4 |
| 8,396,747 B2 | 3/2013 | Bachenheimer | |
| 2002/0012053 A1 | 1/2002 | Yoshida | |
| 2002/0116341 A1 | 8/2002 | Hogan et al. | |
| 2003/0002848 A1 | 1/2003 | Kawaoka et al. | |
| 2003/0023549 A1 | 1/2003 | Armes et al. | |
| 2006/0056626 A1 * | 3/2006 | Keohane | G06F 21/84 380/206 |
| 2010/0024037 A1 * | 1/2010 | Grzymala-Busse et al. | 726/26 |
| 2010/0042583 A1 * | 2/2010 | Gervais et al. | 707/3 |
| 2011/0161332 A1 * | 6/2011 | Milman et al. | 707/754 |
| 2011/0208850 A1 * | 8/2011 | Sheleheda et al. | 709/223 |
| 2011/0307714 A1 * | 12/2011 | Comrie et al. | 713/189 |
| 2013/0144951 A1 * | 6/2013 | Viswanath | H04L 29/08 709/204 |

OTHER PUBLICATIONS

Pinola, Melanie, Use Virtual Credit Card Numbers to Shop Safely Online, Keeping in Mind the Downsides, Aug. 16, 2011.*

* cited by examiner

*Primary Examiner* — Brandon Hoffman
(74) *Attorney, Agent, or Firm* — Day Pitney LLP

(57) ABSTRACT

The present disclosure relates to systems, methods and apparatus for helping keep a user's personally identifiable information private, and to mitigate the efforts of third party vendors from compiling and reselling said data. According to some embodiments, a suite of privacy tools are disclosed that can be downloaded and installed as a browser plugin. The browser plugin can detect when the user has navigated to a page that requires the user to input personal information, such as a login name, login password, email address, phone number, or credit card number. At the user's request, the browser plugin can communicate with a masked information server to generate and provide masked information that corresponds to but is different from the user's actual personal information. Masked emails, phone numbers and credit cards can be disabled in the future.

21 Claims, 12 Drawing Sheets

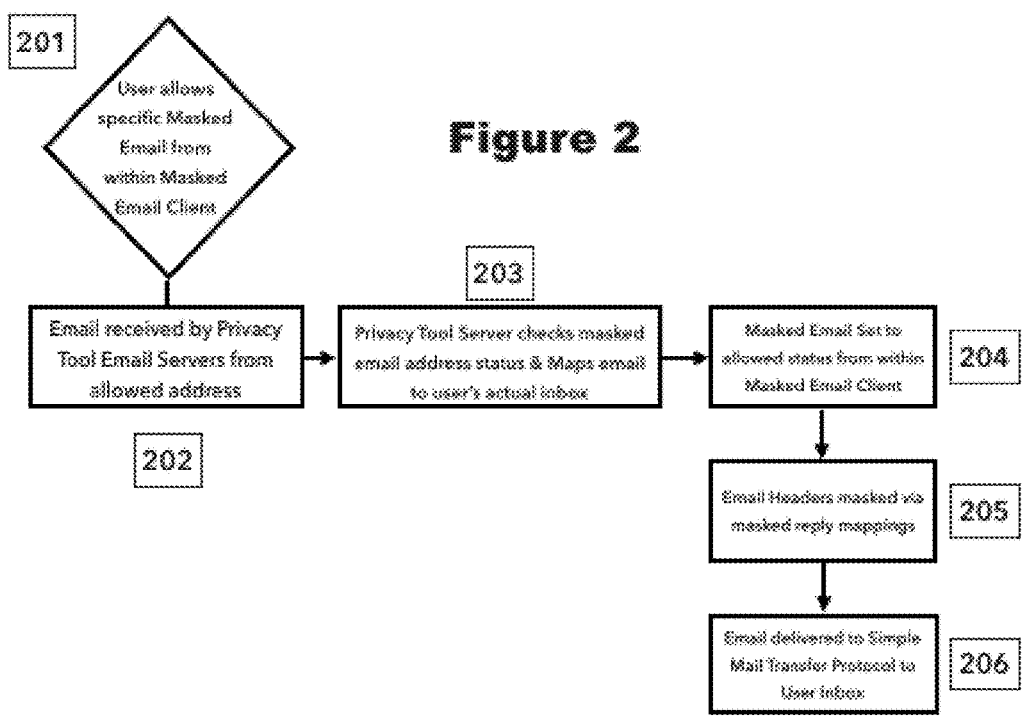

INTERNET PRIVACY TOOL FOR MITIGATING THIRD PARTY TRANSACTION TRACKING

CROSS-REFERENCE TO RELATED APPLICATION

This application claims priority to U.S. Provisional Patent Application No. 61/952,560, filed Mar. 13, 2014, as well as U.S. Provisional Patent Application No. 61/845,406, filed Jul. 12, 2013, the contents of both of which are incorporated by reference herein in their entirety as though fully disclosed herein.

TECHNICAL FIELD OF THE INVENTION

The present invention relates to third party tracking of internet user's browsing activity and provides a tool to mitigate the chances that a user's data is compiled and transmitted for profit to a third party entity.

BACKGROUND OF THE INVENTION

Tracking companies are part of a huge network of advertisers and websites that use cookies, web bugs, and other tracking technologies to collect personal information as purchasers transact purchases on the Internet. These companies create profiles of consumers that often include the sites visited, searches conducted, articles read, items purchased, and more.

Data miners combine this online data with offline data like salary history, voter files, and marriage licenses. Companies use these profiles for various applications, such as targeting online advertisements, determining credit scores, or determining whether a user is qualified for a job. Tracking companies generally make money by either selling a user's information to other companies or displaying ads to the user. Targeted ads can be ads that are based on a user's preferences and browsing habits. For example, if the user has been researching trips to Germany and has visited several websites about the country, trackers know the user's interest in the topic of Germany, and can show the user Germany-related ads on every site that supports targeted advertising.

One of the most significant impacts of data compilation is data discrimination. As discussed above, trackers and advertisers can build and sell detailed profiles about users by collecting and selling personal information such as articles read, email addresses, favorite websites, social media acquaintances, buying habits, and videos watched. Companies can use these profiles for applications that are relatively innocuous (e.g., targeted advertising), but can also use these profiles for applications that users may find objectionable, such as price discrimination, calculation of higher insurance premiums, reduction of credit, employment screening, and identity theft. While there's some value to individual website analytics, like improving the site and the user experience, most tracking is carried out by unaffiliated third parties that consumers wouldn't expect to be involved, with less well-intentioned or clear purposes. Once a profile is compiled about a particular user, the data can be used to show if the consumer, for example, pays with coupons, returns items on a regular basis, or costs the company an unnecessary amount because of longer than necessary customer service use. While it is unclear, this activity could cause unnecessary price discrimination, poorer customer service encounters, and other coupons or discounts from being offered.

Another issue regarding the construction of these detailed user profiles is that these profiles can sometimes end up in the wrong hands. Even major credit bureaus routinely sell personal records to computer hackers and other unsavory characters for profit, which can put a consumer's social security number and other personally identifiable information at risk. Once the data is gleaned from these records, it can be used for identity theft purposes, and can pose a serious risk to consumers transacting online purchases.

OBJECTS AND ADVANTAGES OF THE INVENTION

Considering the foregoing, it is a primary object of the present invention to eliminate third party tracking and compiling of a user's purchasing habits providing maximum protection for the user to navigate to, transact, and navigate away from a website, thus breaking the third party tracker's ability to compile information about the user.

It is a further objective of the present invention to provide a system and method for preventing third party tracking and compiling of a user's purchasing habits by creating a browser plugin that has the ability to automatically enter anonymous data into a checkout form, thus allowing the user to complete a transaction with anonymous data to prevent third party tracking and compiling of the user's purchasing habits.

It is a further objective of the present invention to provide a system and method that gives the user the choice to mask information in the normal web experience the user is already having (e.g., within the same webpage, without requiring the user to navigate to or open another web browsing window). The controls and choice to generate masked information can be presented in the webpage the user is viewing, connected to the actual field with which the user is about to interact.

It is a further object of the present invention to both provide a system and method for preventing theft of a purchaser's personal identity information as a result of an online purchase transaction and also to add an additional layer of protection for the user by blocking the lawful collection of user data through data mining processes to create user profiles that contain compilations of lawfully gathered personally identifiable information.

It is a further object of the present invention to provide a system and method for preventing third party tracking and compiling of a user's purchasing habits by granting the user the ability to supply a secure central billing and shipping address, wherein an entity located at the secure central billing and shipping address has been instructed to forward bills and/or items received at this address to the user's real billing and shipping address. Supplying a real central billing and shipping address rather than a false address minimizes the risk that bills or items will be lost in the mail.

It is a further object of the present invention to provide a system and method for preventing third party tracking and compiling of a user's purchasing habits by allowing the purchaser to communicate in the same manner with a selected merchant as if the user had undertaken the normal, unprotected channel of transacting. For example, it is an object of the present invention to provide a system and method that does not require a participating merchant to pre-register or obtain pre-approval from the operator of the presently disclosed system and method.

It is still a further object of the present invention to provide a system and method for preventing third party tracking and compiling of a user's purchasing habits that provides encrypted storage of its member's personal identity information that is obtained during registration.

It is still a further object of the present invention to provide a system and method for preventing third party tracking and compiling of a user's purchasing habits that requires no change in habits, practices or processes of the merchant.

It is still a further object of the present invention to provide a system and method for preventing third party tracking and compiling of a user's purchasing habits during an online purchase transaction, wherein the purchaser's responses to merchant checkout screens appear identical in kind to those of any new customer from the merchant's perspective, enhanced by the present invention's ability to detect and complete checkout forms entering into the selected field on the web page, in response to the received selection, an alternate piece of information for the user instead of the user's piece of personal information, the alternate piece of information being different from and a substitute for the user's piece of personal information, the alternate piece of information having been generated by one or more server computers in communication with the client computing device over a network.

It is still a further object of the present invention to provide a system and method for preventing theft of a purchaser's personal identity information during an online purchase transaction, wherein the user is able to obtain a limited-balance/limited-duration card directly from the client software without the user having to navigate to other websites in order to create the limited-balance/limited-duration card. In some embodiments, the limited-balance/limited-duration card can be reused for multiple different merchants and for multiple different transactions; in other embodiments, the limited-balance/limited-duration card can be used for only one transaction or for one merchant.

It is still a further object of the present invention to provide a system and method for preventing third party tracking and compiling of a user's purchasing habits through web cookies (also known as a cookie or HTTP cookie, web cookies are pieces of text stored on the computer of a user by a web browser) using a suite of privacy tools throughout the purchase transaction.

SUMMARY OF THE INVENTION

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

In some embodiments, the present invention implements a suite of privacy tools that can be combined into an internet browser extension plugin that are directed at keeping a user's personally identifiable information private to mitigate the efforts of third party vendors to compile and resell said data. Other embodiments in which the suite of privacy tools are embedded into one single or multiple pieces of software are also possible (e.g., as part of a comprehensive privacy/anti-virus software package securing an entire operating system, or network of computers). For ease of disposition, the following description focuses on the embodiments in which the privacy tools are implemented as an internet browser extension plugin, but it is to be understood that the invention is not so limited.

According to some embodiments, to implement the Suite of Internet Privacy Tool for Mitigating Third Party Tracking (hereinafter, "Privacy Tool"), the user can first download and install the browser plugin to the user's Internet web browser on a computer, tablet, or mobile device. The Privacy Tool can have a two-tiered system of protection, e.g., a free and premium version. To become a free user of the invention, the user can create an account within the Privacy Tool to unlock the email-masking component of the Privacy Tool. The email-masking component allows the user to provide masked email addresses, which forwards emails to the user's actual email inbox, for websites that require an email address to transact a purchase. The user can provide the email address to which the user would like to receive masked emails to the Privacy Tool. Once the user's actual email address is entered, the Privacy Tool can generate and provide masked email addresses whenever it is required to by the user's input.

The premium tier of the Privacy Tool can allow the user to mask the user's email address, but can also grant the user the ability to create a masked phone number and a masked credit card without the user having to navigate to another webpage. The phone-masking component allows the user to provide a masked phone number, which forwards calls to the user's actual phone number, on websites that require a phone number to transact a purchase. Likewise, the masked credit card feature allows the user to provide a masked credit card, which debits the user's actual funding account, to transact an online purchase, while keeping the user's billing address masked.

To mitigate the efforts of third party trackers, present on nearly all Internet websites, the user can use the Privacy Tool to ensure that data about the user's transactions are not compiled and resold to additional vendors or entities that profit from the compilation and reselling of user's browsing habits. In some embodiments, user data can be stored locally on the user's device in an encrypted data-store. In other embodiments, this encrypted data-store can also be synchronized across a user's multiple devices through a Privacy Tool Sync Server which allows the user to create masked emails, phone numbers, and credit cards to block third-party tracking on any number of the user's electronic devices. It should be noted that the Privacy Tool's ability to block third party tracking requires no input from the user, and the Tool can automatically block tracking each and every time the user navigates to a different website.

BRIEF DESCRIPTION OF THE DRAWINGS

A clear understanding of the key features of the inventions summarized above may be had by reference to the appended drawings, which illustrate the method and system of the invention, although it can be understood that such drawings depict preferred embodiments of the invention and, therefore, are not to be considered limiting its scope with regards to other embodiments which the invention is capable of contemplating. Accordingly:

FIG. 2 is a flowchart showing the procedure by which a user receives a masked email from the entity to which the masked email was originally supplied, according to some embodiments.

DETAILED DESCRIPTION

Figure 1A:
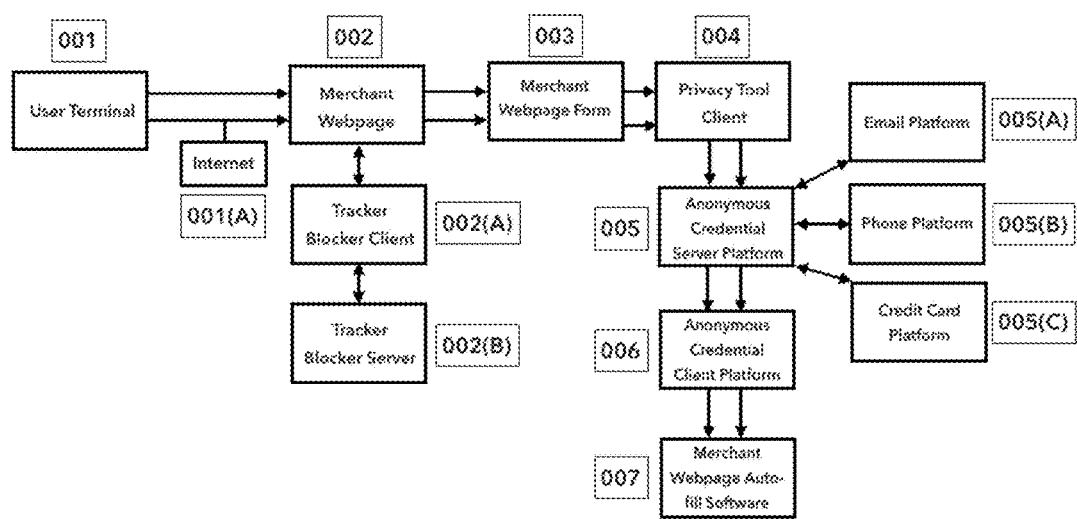
FIG. 1A is a system diagram showing the interaction between a user terminal, a merchant's webpage, the privacy tool client, and back-end server platforms that support the privacy tool client, according to some embodiments.

FIG. 1A is a system diagram showing the Privacy Tool's basic interaction with a merchant's webpage from the moment the user navigates to the merchant's webpage, to the moment at which the Privacy Tool's software automatically fills the requested anonymous information for the user. The user initiates contact with the Merchant's webpage (002) via the user's terminal (001); user's terminal 001 can be any personal computer or mobile device capable of reaching the Merchant's webpage via the Internet (001A). Immediately upon opening the webpage of the merchant, the Privacy Tool installed on the User Terminal 001 can apply the Tracker Blocker Client (002A) to stop the placing of tracker cookies onto the User Terminal (001). The user does not have to interact with the Tracker Blocker Client (002A), and the client can communicate with the Tracker Blocker Server (002B) and can communicate back to the client, informing the Tracker Blocker Client (002A) as to which trackers should be blocked from the incoming merchant website. In some embodiments, for example, the Tracker Blocker Server 002(B) can maintain a "blacklist" of trackers that should be blocked, and/or a "whitelist" of trackers that should be allowed, perhaps according to each tracker's identity, source-code provider, or purpose. Based on this "blacklist" or "whitelist," the Tracker Blocker Client (002A) can block or allow the appropriate trackers from being installed on User Terminal (001). Once the user has decided to make a purchase and has navigated to a Merchant Webpage Form (003), the user can interact with the Privacy Tool Client (004) and the Client can take the following measures: first, depending on which type of form field the user has navigated to, the Privacy Tool Client (004) can contact the Anonymous Credential Server Platform (005) and depending on the type of form to be filled, the Email Platform (005A), the Phone Platform (005B), or the Credit Card Platform (005C) can be prompted to send the correct credentials back thorough the Anonymous Credential Server Platform (005), through the Anonymous Credential Client Platform (006). The Anonymous Credential Client Platform (006) can then input the correct anonymous credentials into the appropriate Merchant Webpage Form (003) through the Client's Merchant Webpage Auto-fill Software (007).

Figure 1B:
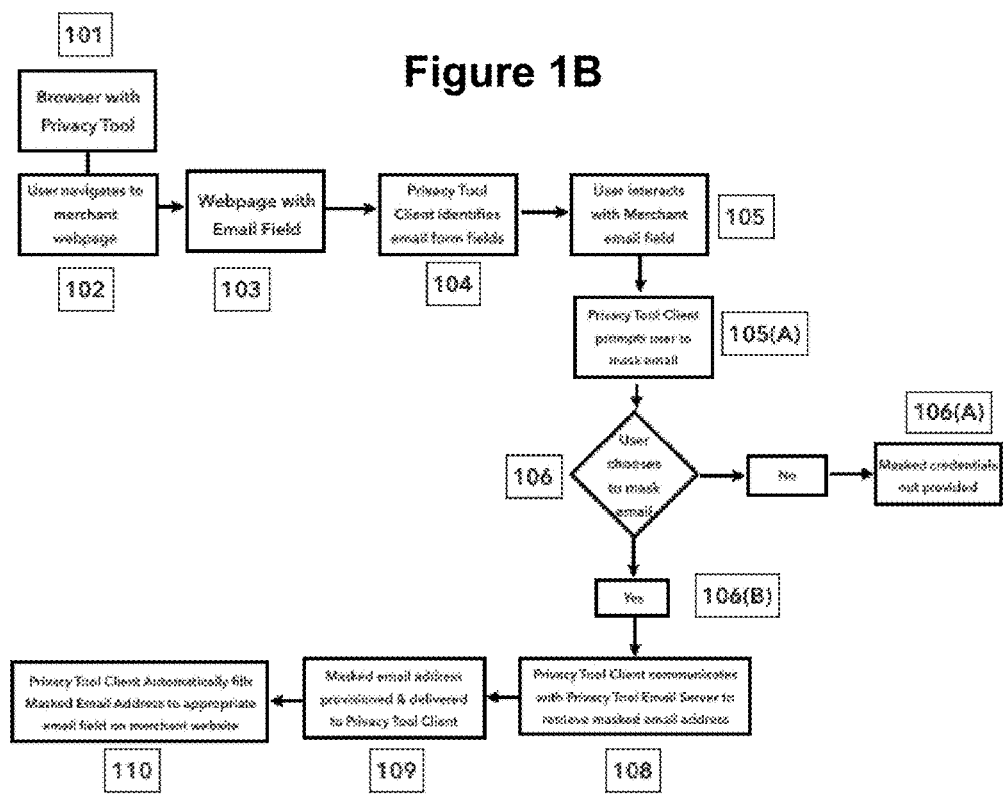
FIG. 1B is a flowchart showing a procedure for creating a masked email address within the Privacy Tool's interface for website registration purposes, according to some embodiments. This illustration shows the process by which an email is masked by the Privacy Tool's email masking software and then filled into the appropriate email field on the particular website.

FIG. 1B is a diagram of the creation of a masked email address within the Privacy Tool's interface, according to some embodiments. Once the user has the Privacy Tool installed to a specific internet browser (101), and once the user navigates to a webpage where a merchant requires an email address to register for a product or service (102), a user has the ability to register for an account on a particular website wherein the website presents a registration form that requires an email address (103). The fact that the webpage includes email form fields can be detected by the Privacy Tool (104). When the user interacts with the registration fields (e.g., by clicking into them) (105), the Privacy Tool appends a small window (105(A)) below the email form field with the choice to either "Disclose my email address" or "Mask my email address" (106/106(A)/106(B)) The user can then select to either fill the user's actual email address (106(A)) or auto-fill a unique masked email address created and used just for this website (106(B)). The Privacy Tool Client communicates with the Email Platform to verify that the client is authorized to use the email feature (108). If the client is authorized to use the email feature, the Email Platform can generate and send to the Privacy Tool Client a masked email address (109). The Privacy Tool's client then auto-fills the Masked Email address for the user with random letters and numbers generated in place of the user's real email address (110).

FIG. 2 is a diagram of the process by which a user receives a masked email from the entity to which the masked email was originally supplied, according to some embodiments. When a user allows email sent to a specific masked email address to reach the user's inbox (201), email sent by the particular website to which the masked email was originally provided is received by the Privacy Tool's servers (202), where the status of the masked email (either allowed or blocked) is confirmed by the Privacy Tool's Email Platform (203). If the masked email address is allowed, the masked email address is then mapped to the user's actual email address (203). In some embodiments, the Privacy Tool Client can also optionally assess the status of the masked email address (either in addition to or in lieu of the assessment performed at the back-end Email Platform in step (203)) and qualify the masked email address as either blocked or allowed (204). Email that is sent to a masked email address that is blocked cannot be routed to the user's actual inbox, but email sent to a masked email address that has not been blocked can be labeled with the appropriate masked email heading (205) to let the user know that the email had originally been directed to a masked email address (for example, the subject line of the email or "from" address of the email can be modified), and the email can be delivered into the user's main email inbox (206). Should the website use, lose, sell, or abuse its access to the user's email, the user can take action from within the user's actual inbox. The user experience to receive a masked email is no different than any other email except for the header of the email that can let the user know that the email is incoming from a website where the user had previously established a masked email address.

Figure 3:
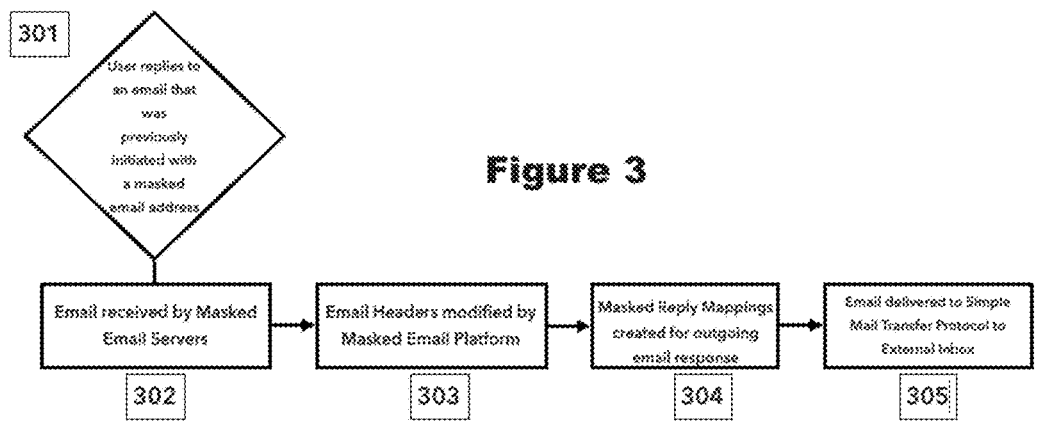
FIG. 3 is a flowchart showing the procedure by which a user can respond to an email in a way that does not allow the dissemination of the user's actual data, according to some embodiments.

FIG. 3 is an illustration of the process by which a user can respond to an email in a way that does not allow the dissemination of the user's actual data, according to some embodiments. The user can choose to respond to a masked email in the same privacy oriented manner in which the user first chose to supply the masked email. For example, the Privacy Tool can give the user the option to respond to the masked email in a way that is separate and apart from the normal way the user would respond based on the user's email host (301). Once chosen, the user's masked reply can be sent through the Privacy Tool's email servers (i.e., the Email Platform) (302) that can modify and apply different headers (303) to the reply to keep the user's data private by remapping the route of the masked reply to come from another entity that is unrelated to the user's actual inbox and applied to the headers of the reply (304). Once complete, the email reply can be sent to an external email inbox via a simple email transfer protocol (305).

Figure 4:
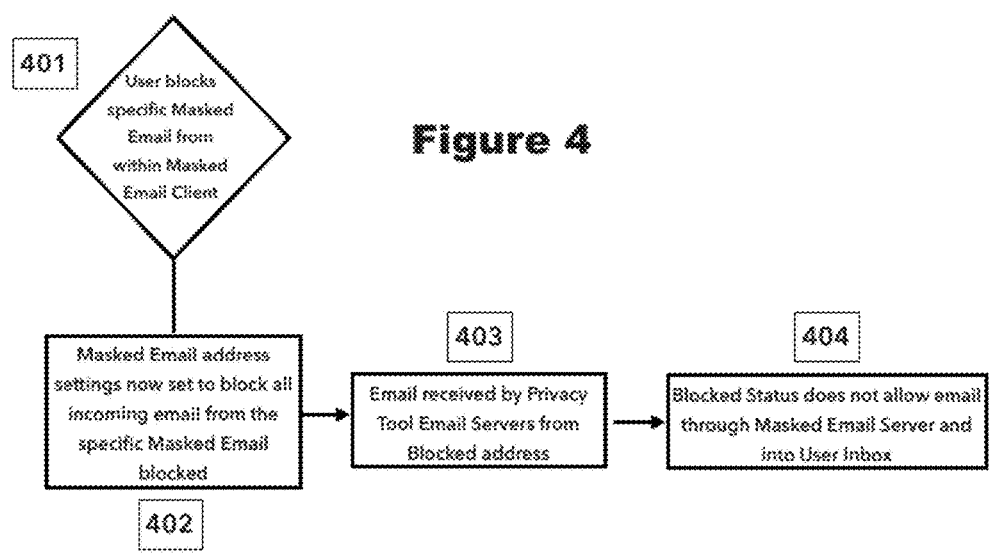
FIG. 4 is a flowchart showing the procedure by which a user can block a previously created masked email address, according to some embodiments. If the user's masked email was transmitted without the consent of the user, the Privacy Tool cancan allow the user to see where the email address was transmitted and disallow further emails sent to that masked email address.

FIG. 4 is an illustration of the process by which a user can block a previously created masked email address, according to some embodiments. If the user's masked email was transmitted without the consent of the user, the Privacy Tool can allow the user to see where the email address was transmitted and disallow further emails from the entity. If a user receives unwanted email to a certain masked email address or has discovered the user's masked email was transmitted without the consent of the user, the Privacy Tool can allow the user to see where the email address was transmitted (i.e., which websites had received the masked email address) and disallow further emails from that masked email address. This can be done, for example, by toggling "Allowed" or "Blocked" status buttons within the Privacy Tool's client interface or within the masked email header itself (401). Once the status has changed to "Blocked," the Privacy Tool's Masked Email Address settings can disallow further emails from reaching the user from the particular masked email in question (402). Once an email is received from a blocked email address by the Privacy Tool Email Platform (403), the Email Platform can disallow the masked email from reaching the end user's email inbox due to the user having communicated to the servers that additional emails from the particular address should not be forwarded to the user's actual inbox (404).

Figure 5:
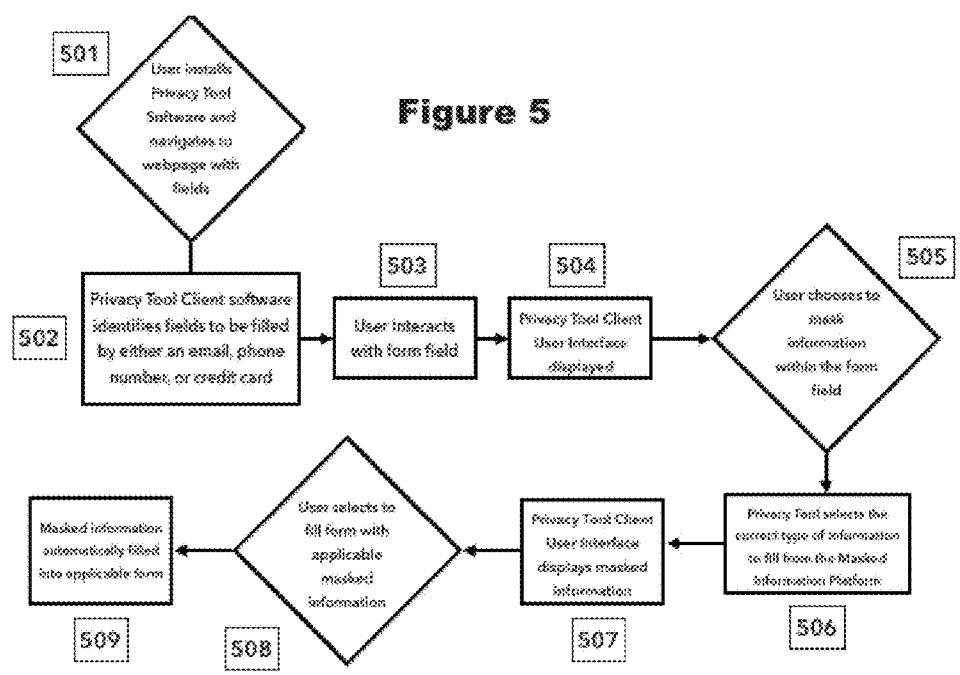
FIG. 5 is a flowchart showing how the Privacy Tool interacts with a website's form, according to some embodiments. The illustration shows one possible process by which form data is shielded and inputted into a website's blank form. Once selecting this option, the user is given the ability to create masked information by employing the Privacy Tool's software to create masked data for the user that the Privacy Tool then inputs into the appropriate form field.

FIG. 5 is a diagram of the Privacy Tool's software interacting with a website's form generally, according to some embodiments. The illustration shows the process by which form data, in any embodiment, is shielded and inputted into a website's blank form. Once selecting this option, the user is given the ability to create masked information by selecting to use the features of the Privacy Tool and employing the Privacy Tool's software to create masked data that the Privacy Tool then inputs into the appropriate form field. To eliminate third party tracking and compiling of a user's purchasing habits and provide maximum protection for the user to navigate to, transact, and navigate away from a website, the Privacy Tool can generate and store masked credentials when a user interacts with any website that has appropriate forms that need filling. Masked credentials can include, for example, an email address, a phone number, a credit card number, a login username, or a login password. Once the Privacy Tool has been installed into the user's web browser and the user navigates to a webpage with a blank form of some type (e.g., email address, phone number, credit card number, login username, login password) (501), the Privacy Tool can detect the ID fields (502) and once the user actively interacts with the field (503) the Privacy Tool Client can display the applicable interface (i.e. email, phone, credit card, login ID, login password, or other masking interface) to the user (504). The user can select which piece of information the user would like to mask (505) depending on the requisite field on the website. If the user selects to mask the user's information, the Privacy Tool software can display the masked information choices and the user can have the option to mask the user's email, phone, credit card, or other information without having to navigate away from the website (506). In some embodiments, the masked information choices can be generated (in the case of a new masked email/phone/credit card number/other information) or sent (in the case of a previously generated masked email/phone/credit card number/other information) from the Anonymous Credential Server Platform to the privacy tool client. The Privacy Tool can finally display the masked information to input in the form field (507), the user can select to input the masked information in the form field (508). In some cases, the Privacy Tool can display multiple options for masked information to input, and the user can select one of the options for filling into the website's form field. The masked information can then be supplied into the appropriate field (509) and the user can establish an account with the website without ever having to disseminate the user's own personal information and without having to repeatedly use the same credentials that would help tracking companies to build a profile about the user.

Figure 6:
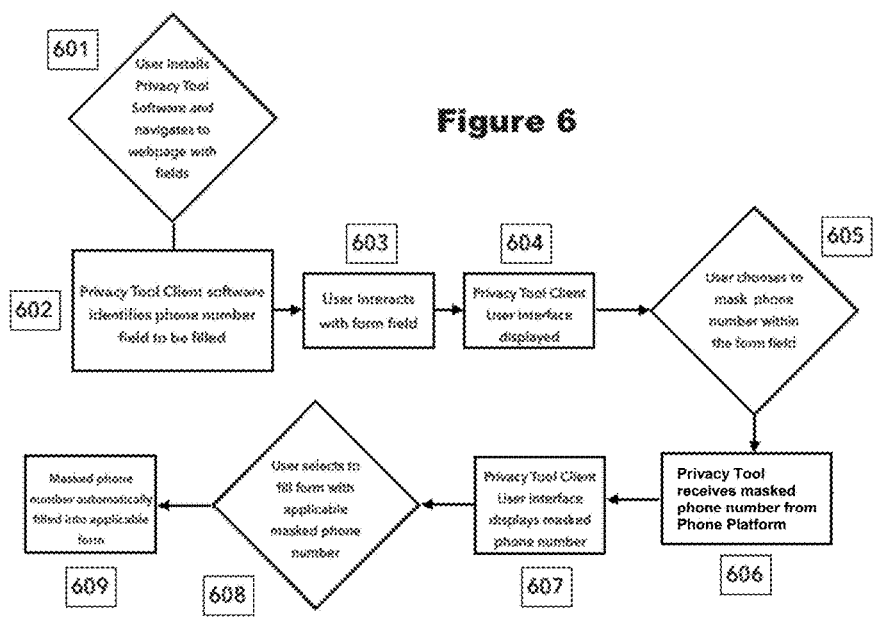
FIG. 6 is a flowchart showing how the Privacy Tool's software can create a masked phone number for the user for online transactions to block third party tracking of user purchases and tying of specific purchases to a user's phone, according to some embodiments. For example, the Privacy Tool's software can detect a form field that is specifically for a phone number input. Once the Privacy Tool's software detects the phone form field, it can give the user the ability to mask phone data, and if selected by the user, the Privacy Tool's software creates a masked phone number for the user that the Privacy Tool then inputs into the appropriate phone form field.

FIG. 6 is a diagram of the Privacy Tool's process for creating a masked phone number for the user for online transactions to block third party tracking of user purchases and tying of specific purchases or browsing habits to a user's phone, according to some embodiments. Once the Privacy Tool has been installed into the user's web browser, and once a user navigates, to a website with a form-fill page containing a form field for the user's phone number (601), the Privacy Tool can detect the phone fields (602) and if the user interacts with the phone field (603), the Privacy Tool Client can display the masked phone interface to the user (604). If the user selects to mask the user's phone number (605), the Privacy Tool software can contact the Privacy Tool's Phone Platform (606). The Phone Platform can be in communication with a phone service provider, wherein the phone service provider has the capability to generate a new masked phone number. Once a new number is generated, the phone service provider can deliver the masked phone number to the Phone Platform, which can then deliver the number to the Privacy Tool Client. The masked phone number can be set up such that it is different from the user's actual phone number, but calls directed at the masked number will be received by the phone service provider, and automatically forwarded to the user's actual phone number (unless the masked number is blocked). The Privacy Tool Client can then display the Privacy Tool's Masked Phone User Interface to the user (607). Once the user has selected to mask the user's phone number (608), the Privacy Tool Client can finally input the masked information into the appropriate phone field (609) and the user can establish an account with the website without ever having to disseminate the user's own personal information and without having to repeatedly use the same credentials that would help tracking companies to build a profile about the user.

Figure 7:
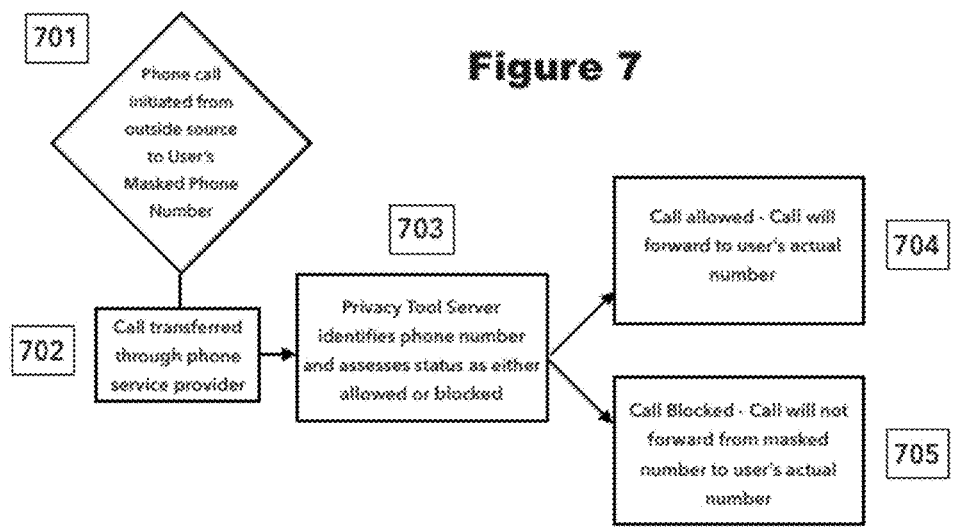
FIG. 7 is a flowchart illustrating the Privacy Tool's ability to allow a user to block further calls to a previously created masked phone number, according to some embodiments. If the user's masked phone number was transmitted without the consent of the user, the Privacy Tool can allow the user to see where the phone number was transmitted and disallow further phone calls to that masked phone number.

FIG. 7 is a diagram illustrating how a user can block further calls to a previously created masked phone number, according to some embodiments. If a phone call is initiated by an outside caller to a masked phone number (701), the call can be received by the masked phone user phone service provider (702) and one of two possible events can occur: first, the Privacy Tool can compare the incoming call with the list of blocked numbers, if any, within the Privacy Tool (703). If the number is not blocked by the Privacy Tool's software, then the phone call can be forwarded to the user's masked phone number (704). If the user blocked the particular incoming phone number using the Privacy Tool software in the past, then the call will not complete and the phone number can remain blocked unless toggled otherwise (705). If the user's masked phone number was transmitted without the consent of the user, the Privacy Tool can allow the user to see where the phone number was transmitted and disallow further phone calls from the entity or related entities within the Privacy Tool's user interface.

Figure 8:
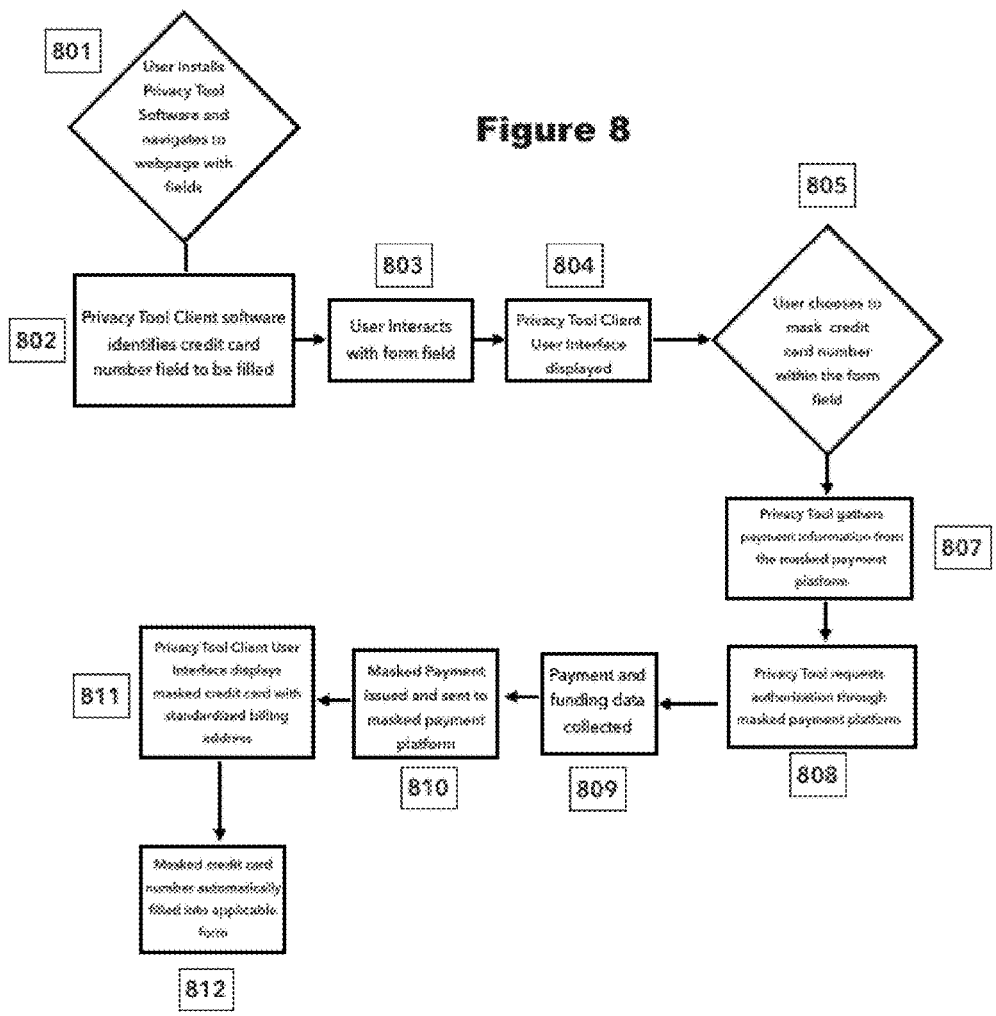
FIG. 8 is a flowchart illustrating the Privacy Tool's ability to allow a user to create a masked credit card for online transactions to block third party tracking of user purchases and tying specific purchases to a user's credit card, according to some embodiments.

FIG. 8 is an illustration of how a user can use the Privacy Tool create a masked credit card for online transactions to block third party tracking of user purchases and tying specific purchases to a user's credit card, according to some embodiments. Once the Privacy Tool has been installed into the user's web browser, and once a user navigates to a website with a form-fill page containing a form field for the user's credit card number (801), the Privacy Tool can detect the credit card fields (802). Once the user interacts with the form field (e.g., by clicking into it) (803), the Privacy Tool can display the masked credit card interface to the user (804). The masked credit card interface can comprise a window that opens near the credit card form field that gives the user the option to mask his/her credit card number, and if so, to use a masked credit card that has been previously generated or to generate an entirely new masked credit card number. If the user selects to generate a new masked card (805), the Privacy Tool, in conjunction with the Credit Card Platform, can generate a masked card via the following operations: First, in some embodiments, the Privacy Tool can gather payment information that has been previously supplied by the user to gain premium subscription status (807). Next, the Privacy Tool can request payment authorization through the Credit Card Platform (808). In some embodiments, the Credit Card Platform can perform an optional fraud and license analysis to make sure that the user is authorized to generate masked credit cards. If, for instance, the payment information previously supplied by the user included a credit card that is expired or maxed out, the Credit Card Platform can be configured to not generate a masked credit card number. Alternatively, if the payment information supplied by the user is linked or associated with illegal or fraudulent activity in some way (e.g., if the real credit card number supplied by the user is associated with known illegal, fraudulent or other nefarious actions), the Credit Card Platform can be configured to not generate a masked credit card number. After this optional fraud analysis, the Credit Card Platform can collect the necessary funding and payments data (809), and issue masked credit card number (810). The generated masked credit card number can correspond to a limited-balance, limited-duration credit card that is generated solely for the purpose of one transaction, or a limited set of transactions. For example, a user can generate a masked credit card that has a credit limit of $10 that is set to expire within one week. Therefore, even if a third party were to get a copy of the information associated with this masked credit card, the information will be of little use to the third party because he could only withdraw $10 from it for one week. The issuance of the masked payment can prompt the Masked Payments Platform (810) to deliver the payment data to the Privacy Tool Client user interface showing a masked credit card with a standardized, actual street billing address for the billing address that the user can use to protect billing information (811), causing the Privacy Tool's user interface to auto-fill the appropriate credit card field with a new masked credit card number (812) so the user can establish an account with the website without ever having to disseminate the user's own personal information and without having to repeatedly use the same credentials that would help tracking companies to build a profile about the user. To further protect the user, the user can input a central billing and shipping location to bolster online anonymity. From the merchant's perspective, the merchant can use the masked credit card number as if it was the user's actual credit card number, i.e., no changes or additions to the merchant's processes are required to use the masked credit card number.

Figure 9:
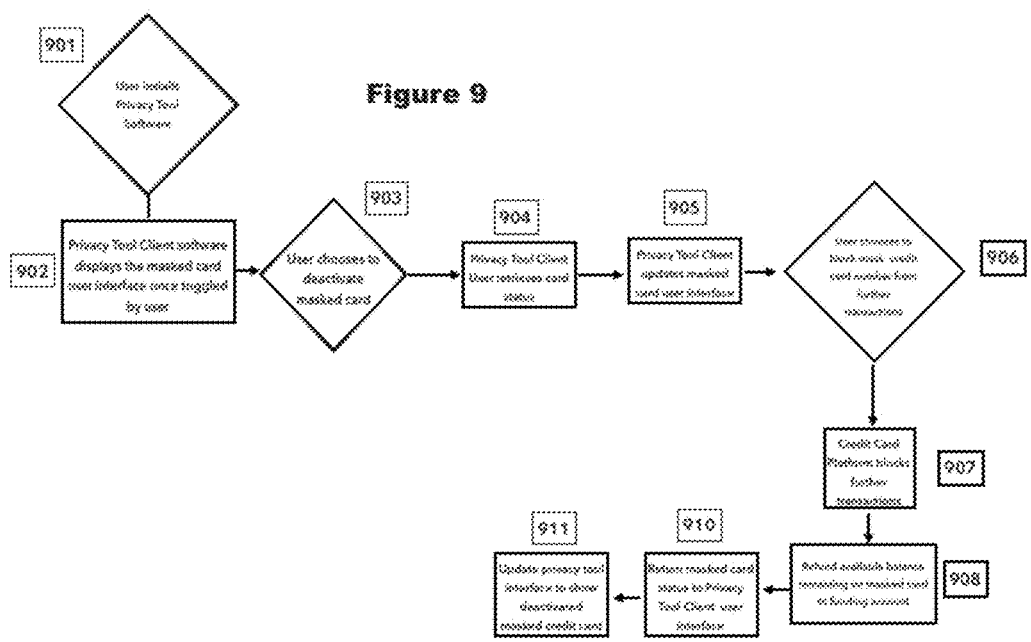
FIG. 9 is a flowchart illustrating the Privacy Tool's ability to allow a user to block a masked credit card for online transactions and later create an additional masked card to make purchases, all in an effort to block third party tracking of user purchases and tying specific purchases to a user's credit card, according to some embodiments.

FIG. 9 is an illustration of the Privacy Tool's ability to allow a user to block a masked credit card for online transactions and later create an additional masked card to make purchases, all in an effort to block third party tracking of user purchases and tying specific purchases to a user's credit card, according to some embodiments. Once the Privacy Tool has been installed into the user's web browser (901), the Privacy Tool gives the user the option to deactivate the previously created credit card (902). Deactivating the masked credit card can prompt the Privacy Tool to retrieve the masked credit card's status and/or transaction history from the Credit Card Platform (904). Once the masked credit card's status and/or transaction history has been retrieved, the Privacy Tool Client can update its display to allow the user to see the status and/or list of transactions on that particular masked card (905). Once the user has decided to block the card from further use (906), the Credit Card Platform (907) can block all further transactions from being performed with the masked card and can refund the remaining balance (908). The refunded masked credit card can now be in a deactivated state and cannot be used to execute any further transactions. This status can be reflected through the Privacy Tool Client (910) and can update the user interface to show the masked card with a deactivated status (911). The user is free to continue making masked cards for any and all online transactions so that the user will not have to repeatedly use the same credentials that would help tracking companies to build a profile about the user.

Figure 10:
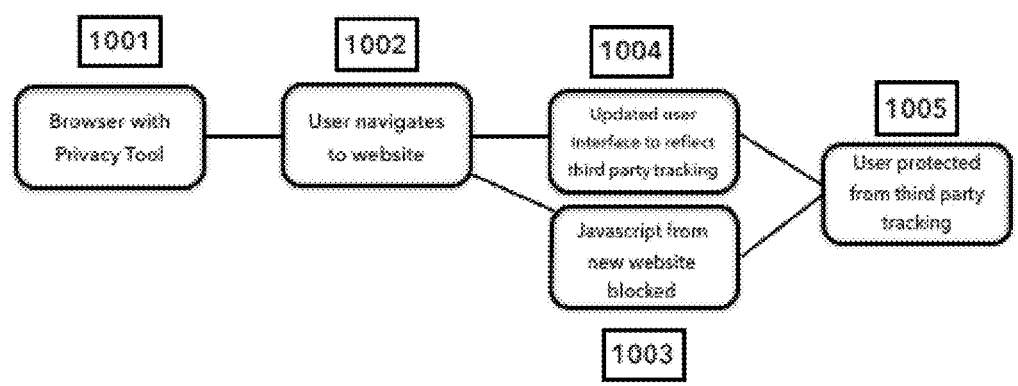
FIG. 10 is an illustration of the Privacy Tool's ability to block tracking entities from compiling data on a specific user's browsing habits on any website visited by the user with the Privacy Tool software installed, according to some embodiments.

FIG. 10 is a diagram of the Privacy Tool's ability to block tracking entities from compiling data on a specific user's browsing habits on any website visited by the user with the Privacy Tool software installed. Once the Privacy Tool has been installed into the user's web browser (1001), the user has the ability to navigate to a website (1002) with an additional layer of protection via the Privacy Tool's tracker blocking software. Upon arrival at a new website, the Privacy Tool can undertake two tasks simultaneously. First, the Privacy Tool can block incoming Javascript from marketing and advertising trackers that sit within the websites parameters and collect data on users entering and exiting the website (1003). Simultaneously, the Privacy Tool can update the user interface to display to the user each and every tracker that is being blocked (1004). These simultaneous actions can protect a user from being tracked on website that employ trackers to gather data (1005). This tracker blocking ability, coupled with the Privacy Tool's ability to block email addresses, phone numbers, and credit card numbers, adds an extra layer of protection to the user's browsing experience in a comprehensive tool for keeping a user's personally identifiable information private in order to mitigate the efforts of third party vendors compiling, and reselling said data. The tool not only prevents identity theft, but also assists a user in preventing privacy theft.

Figure 11:
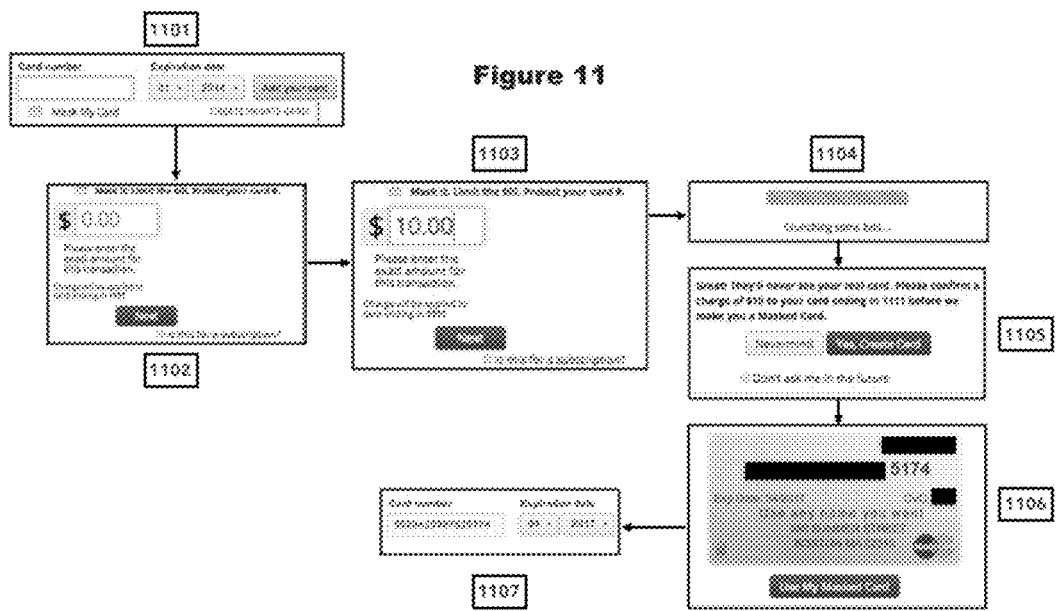
FIG. 11 is a diagram of the Privacy Tool's plug-in user interface, according to some embodiments.

FIG. 11 is a diagram of the Privacy Tool's plug-in user interface, according to some embodiments. Once the Privacy Tool has been installed and the user navigates to a website with a checkout form, the Privacy Tool user interface can prompt the user to mask the user's credit card in the credit card field (1101). Once the user has selected to mask the user's credit card, the user can be shown the Funding Interface (1102), in which the user can input a sum of currency to mask (1103). Once the user inputs the funding amount, the Privacy Tool user interface can communicate with the Privacy Tool Server (1104), and can ask the user to finalize the creation of the masked card for the amount input in 1103 (1105). Once the user agrees to creates the masked card, a masked card can be issued for the user displaying a credit card number, expiration date, billing address, and CVC (1106). Once the user selects to use the recently generated masked card, the Privacy Tool can auto-fill the corresponding credit card field (1107). Although FIG. 11 and its associated description is directed to embodiments regarding the masking of a user's credit card information, a similar process can also be used to mask other personal information, such as the user's email, phone number, login ID, or login password.

In all of the processes described above, in the event that the website with which the user is interacting requests a shipping or billing address, the user can instruct the Privacy Tool Client and its corresponding back-end platforms (e.g., Anonymous Credential Server Platform 005, in conjunction with Credit Card Platform 005(C)) to provide either (i) a false, anonymous address, or (ii) the address of a secure, central billing and shipping facility. With regard to option (i), the false anonymous address can be a random collection of alphanumeric characters that have no correspondence with a real physical address. In such instances, the Anonymous Credential Server Platform can be configured to automatically set up a mail forwarding scheme at at least one common mail carrier (e.g., the United States Postal Service, or USPS), whereby correspondence and items shipped to the false anonymous address can be redirected to the user's real address. However, using a false anonymous address requires that the USPS accurately maintain the user's real forwarding address. This can sometimes entail a greater risk that mail or items directed to the user will be lost. Alternatively, the user can instruct the Privacy Tool Client 004 and its corresponding back-end platforms to provide the address of a secure, central billing and shipping facility. This address can correspond to a real-world physical address of an entity associated with the Privacy Tool Client and the Anonymous Credential Server Platform. For example, this address can correspond to the mailing address of a corporation that also maintains Privacy Tool Client 004 and Anonymous Credential Server Platform 005. The secure, central billing and shipping facility can have access to a database containing the correspondence between a user's masked identity and a user's actual identity and shipping address. Once correspondence or items are received at the secure, central billing and shipping facility, the facility can look up the user's actual identity based on a masked name or identifier printed on the correspondence/item's "Ship To" label, and ship the correspondence or item to the user's actual address. In this way, the risk of losing correspondence or items in the mail can be mitigated.

The processes described above are exemplary and not limiting. Any of the processes can be altered, e.g., by having steps added, altered, removed, or rearranged. Many other alternatives are possible.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method for interactively facilitating protection of personal information of a user of a client computing device during a transaction, the method comprising:
    providing the user with an option to conceal a piece of personal information of the user when the user selects a field on a web page that requires entry of the piece of personal information;
    receiving a selection by the user to conceal the piece of personal information in response to the provided option; and
    entering into the selected field on the web page, in response to the received selection, an alternate piece of information for the user instead of the piece of personal information, the alternate piece of information being different than and a substitute for the piece of personal information, the alternate piece of information having been generated in response to the selection and by one or more server computers in communication with the client computing device over a network, wherein the alternate piece of information can be used by an entity without sharing the piece of personal information with the webpage to conduct the transaction with the user.

2. The method of claim 1, wherein the option is provided in a window near the selected field on the web page.

3. The method of claim 1, wherein the alternate piece of information corresponds to the piece of personal information and the correspondence between the alternate piece of information and the piece of personal information is stored and available to the one or more server computers and the user but not the web page.

4. The method of claim 1, wherein the network is the Internet.

5. The method of claim 1, wherein the client computing device is a desktop computer, a laptop computer, or a handheld mobile device.

6. The method of claim 1, wherein the piece of personal information is at least one of an email address of the user, a phone number of the user, a credit card number of the user, a login username of the user, and a login password of the user.

7. The method of claim 1, wherein the transaction comprises sending an email message from the entity to the user.

8. The method of claim 1, wherein the transaction comprises establishing a phone call between the entity and the user.

9. The method of claim 1, wherein the transaction comprises charging, by the entity, a payment account associated with the user.

10. A method of interactively protecting personally identifiable credit card information of a user of a client computing device during a transaction, the method comprising:
    receiving an indication that the user has selected a field on a web page, wherein the field requires entry of personally identifiable credit card information of the user;
    receiving an indication that the personally identifiable credit card information of the user is to be concealed; and
    in response to the received indication that the personally identifiable credit card information of the user is to be concealed, generating and entering into the selected field on the web page an alternate piece of information, the alternate piece of information being different from and a substitute for the personally identifiable credit card information of the user wherein the alternate piece of information can be used by an entity without sharing the personally identifiable credit card information of the user with the webpage to conduct the transaction with the user.

11. The method of claim 10, wherein the user's selection of the field on the web page causes a window to appear, the window providing the user with an option to conceal the user's piece of personally identifiable credit card information of the user.

12. The method of claim 10, wherein the alternate piece of information corresponds to the personally identifiable credit card information of the user and that correspondence is stored and available to one or more server computers over a network but is unavailable to the web page.

13. The method of claim 10, wherein the transaction comprises charging, by the entity, a payment account associated with the user.

14. A method for interactively facilitating protection of an e-mail address of a user of a client computing device, the method comprising:
 providing the user with an option to conceal the e-mail address when the user selects a field of a website that requires entry of the e-mail address;
 receiving, a selection by the user to conceal the e-mail address in response to the provided option; and
 entering into the selected field on the web page, in response to the received selection, an alternate e-mail address for the user instead of the e-mail address, the alternate e-mail address being different than and a substitute for the e-mail address, the alternate e-mail address having been generated in response to the selection and by one or more server computers in communication with the client computing device over a network, wherein the alternate e-mail address can be used by an entity without sharing the e-mail address with the web site.

15. The method as in claim 14, further comprising receiving e-mail communication from the website directed to the alternate e-mail address and forwarding the e-mail communication to the e-mail address.

16. The method as in claim 15, wherein the forwarding is performed by the one or more server computers in communication with the client computing device over a network.

17. A method for interactively facilitating protection of a telephone number of a user of a client computing device, the method comprising:
 providing the user with an option to conceal the telephone number when the user selects a field of a website that requires entry of the telephone number;
 receiving, a selection by the user to conceal the telephone number in response to the provided option; and
 entering into the selected field on the web page, in response to the received selection, an alternate telephone number for the user, the alternate telephone number being different than and a substitute for the telephone number, the alternate telephone number having been generated in response to the selection and by one or more server computers in communication with the client computing device over a network, wherein the alternate telephone number can be used by an entity without sharing the telephone number with the web site.

18. The method as in claim 17, further comprising receiving a call to the alternate telephone number and forwarding the call to the telephone number.

19. The method as in claim 18, further comprising selectively blocking calls to the alternate telephone number.

20. A computer program product comprising machine executable instructions stored on non-transient machine readable media, the instructions configured for causing a client computing device to interactively facilitate protection of personal information of a user of a client computing device during a transaction by implementing a method comprising:
 providing a user of the client computing device with an option to conceal a piece of personal information of the user when the user selects a field on a web page that requires entry of the piece of personal information;
 receiving a selection by the user to conceal the piece of personal information in response to the provided option; and
 entering into the selected field on the web page, in response to the received selection, an alternate piece of information for the user instead of the piece of personal information, the alternate piece of information being different than and a substitute for the piece of personal information, the alternate piece of information having been generated in response to the selection and by one or more server computers in communication with the client computing device over a network, wherein the alternate piece of information can be used by an entity without sharing the piece of personal information with the webpage to conduct the transaction with the user.

21. The computer program product as in claim 20, provided as browser plug-in.

* * * * *